United States Patent
Kurimoto

(10) Patent No.: US 12,524,050 B2
(45) Date of Patent: Jan. 13, 2026

(54) BATTERY MANAGEMENT SYSTEM

(71) Applicant: TOYOTA JIDOSHA KABUSHIKI KAISHA, Toyota (JP)

(72) Inventor: Yasuhide Kurimoto, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 18/458,722

(22) Filed: Aug. 30, 2023

(65) Prior Publication Data
US 2024/0094790 A1    Mar. 21, 2024

(30) Foreign Application Priority Data

Sep. 20, 2022  (JP) .................... 2022-149076

(51) Int. Cl.
| | | |
|---|---|---|
| G06F 1/26 | (2006.01) | |
| B60L 3/12 | (2006.01) | |
| B60L 53/65 | (2019.01) | |
| B60L 58/16 | (2019.01) | |
| H01M 10/42 | (2006.01) | |
| H01M 10/48 | (2006.01) | |

(52) U.S. Cl.
CPC ..................... *G06F 1/26* (2013.01)

(58) Field of Classification Search
CPC ....................................... G06F 1/26
See application file for complete search history.

(56) References Cited

U.S. PATENT DOCUMENTS

| | | | | |
|---|---|---|---|---|
| 7,710,073 | B2 * | 5/2010 | Yamauchi | H01M 10/48 320/132 |
| 9,904,531 | B2 * | 2/2018 | Suzuki | G06F 8/65 |
| 10,860,828 | B2 * | 12/2020 | Kimura | H01M 10/425 |
| 2002/0121969 | A1 * | 9/2002 | Joao | B60R 25/102 340/425.5 |
| 2008/0043146 | A1 * | 2/2008 | Lee | H04N 21/47 348/569 |
| 2011/0178746 | A1 * | 7/2011 | Sugaya | H02J 7/005 702/63 |
| 2015/0135336 | A1 * | 5/2015 | Arasavelli | H04L 63/102 726/29 |
| 2020/0364661 | A1 * | 11/2020 | Yamasaki | B60L 58/16 |

* cited by examiner

*Primary Examiner* — Davetta W Goins
*Assistant Examiner* — Pameshanand Mahase
(74) *Attorney, Agent, or Firm* — Sughrue Mion, PLLC

(57) ABSTRACT

A server performs a process, including: if there is a code authentication request (YES in S200), a step of performing a code authentication process (S202) and a step of transmitting a result of authentication (S204); and if battery information is received (YES in S206), a step of storing the battery information (S208), a step of calculating a degradation estimate (S210), a step of setting degradation information in accordance with a code (S212), and a step of transmitting the degradation information (S214).

4 Claims, 5 Drawing Sheets

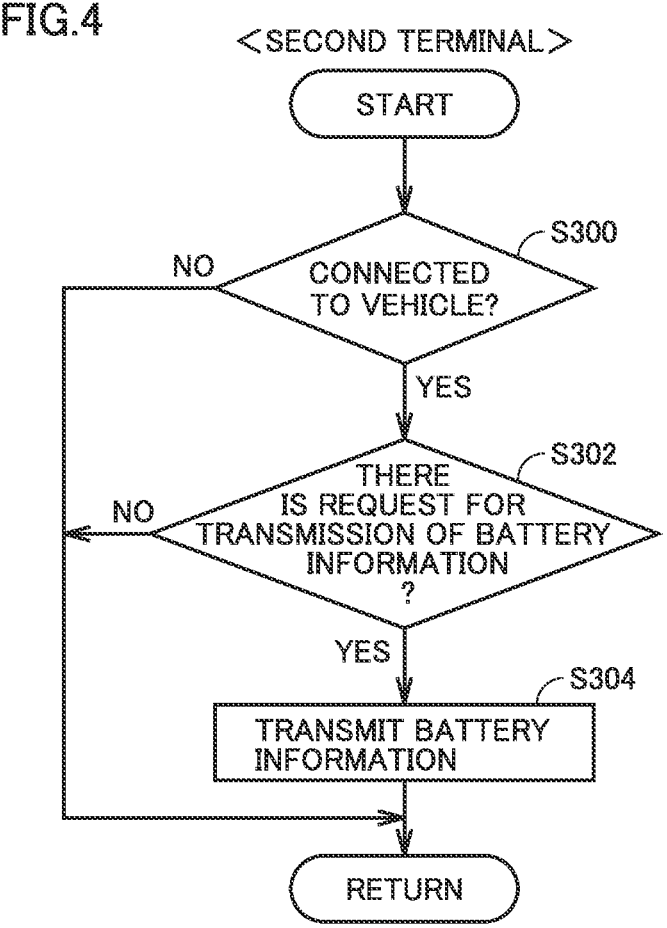

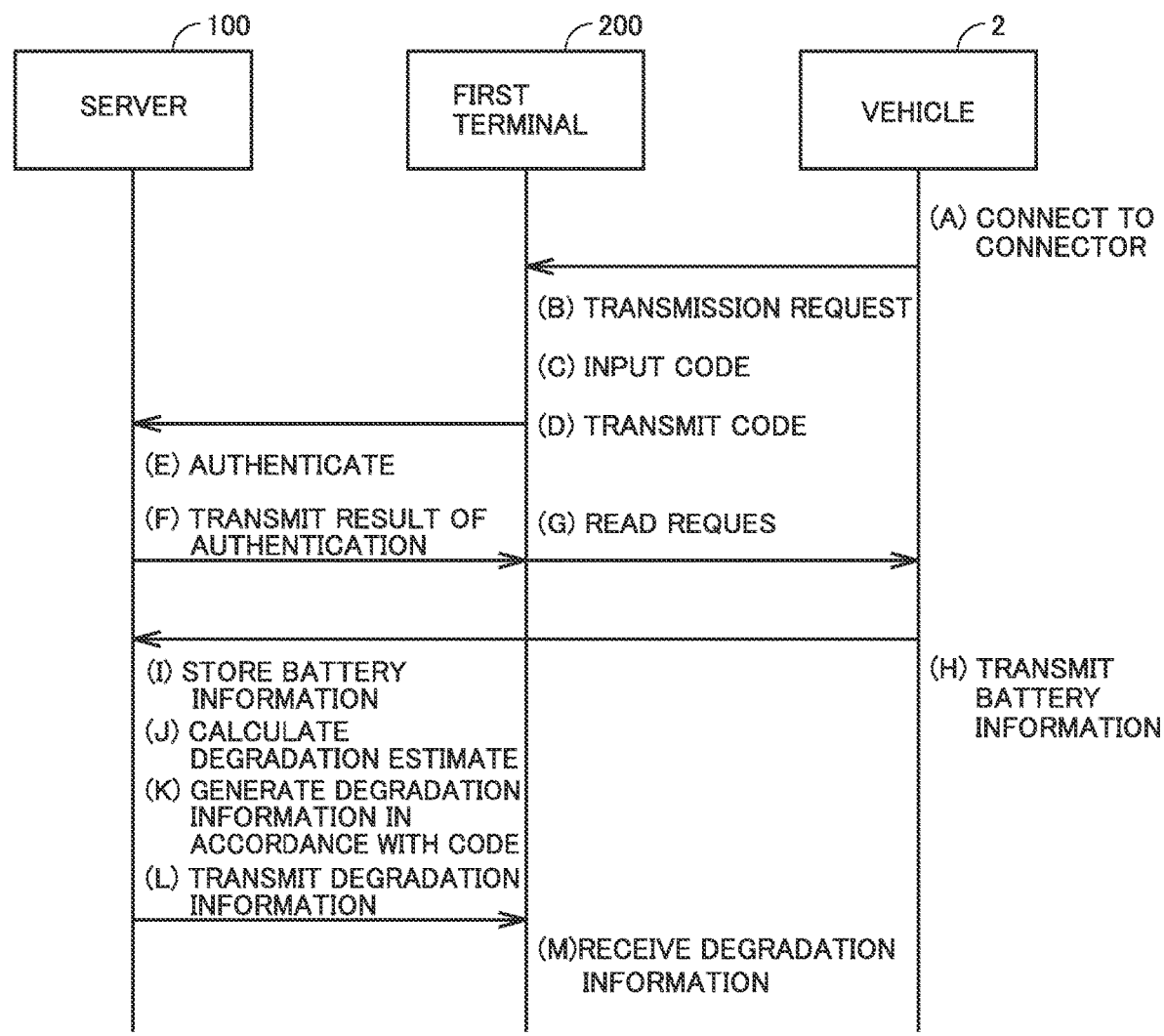

BATTERY MANAGEMENT SYSTEM

CROSS REFERENCE TO RELATED APPLICATIONS

This nonprovisional application is based on Japanese Patent Application No. 2022-149076 filed on Sep. 20, 2022 with the Japan Patent Office, the entire content of which is hereby incorporated by reference.

BACKGROUND

Field

The present disclosure relates to a battery management system.

Description of the Background Art

An information system is known which provides the information on a secondary battery according to a destination such as a car body shop repairing electric-powered vehicles (e.g., battery electric vehicles or hybrid vehicles, etc.) that use a secondary battery as a power source; an auto wrecker dismantling electric-powered vehicles; a recycler reusing used secondary batteries mounted on electric-powered vehicles; or a user, such as a researcher studying the statuses of used secondary batteries.

For example, Japanese Patent Laying-Open No. 2021-099726 discloses a technique of: reading, in response to a request containing the information identifying a secondary battery and a requested level, the evaluation information in accordance with the requested level from a battery database storing evaluation information items such as "a room-temperature capacity," "a low-temperature capacity," "a room-temperature output," and "a low-temperature power;" and providing a requesting user with the evaluation information read from the battery database. Note that Japanese Patent Laying-Open No. 2021-099726 discloses that the user can raise the requested level by purchasing an authority from an information provider.

SUMMARY

In the information system as described above, if various information are obtained via a communication network such as the Internet, the safety when providing information may decrease. In particular, history information about the status of a secondary battery can be used to estimate the status of the secondary battery such as a degradation level or evaluate the performance of the secondary battery, and is thus versatile and high safety is required to be ensured when providing information. In contrast, it is conceivable that the various information is provided only through a dedicated line to ensure the safety. However, for example, this may place certain restrictions on the connection to the dedicated line and cause the user convenience to deteriorate.

An object of the present disclosure is to provide a battery management system in which the degradation information of a secondary battery is provided to a user while ensuring the user convenience and ensuring high safety when providing information.

A battery management system according to a certain aspect of the present disclosure includes: an apparatus on which a secondary battery and a storage unit storing history information of the secondary battery are mounted; a server that manages degradation information of the secondary battery; and a first terminal that is communicatively configured with the server via the Internet and includes an interface capable of wired communications with the apparatus. The server includes: an acquisition unit that permits the first terminal to read the history information from the apparatus and obtains the history information from the first terminal when the first terminal and the apparatus are connected together in a manner capable of the wired communications with each other via the interface and the acquisition unit receives a code from the first terminal and the code is a predetermined code; a calculation unit that calculates an estimate of a degradation level of the secondary battery, using the history information obtained; and an output unit that outputs the degradation information having an information level corresponding to the code, using the estimate.

Doing so permits the first terminal to read the history information from the apparatus by the code, and causes the degradation information having the information level corresponding to the code to be output. Therefore, the degradation information can be provided to the user via the Internet, while ensuring the user convenience and ensuring high safety when providing information.

In a certain embodiment, the information level includes a plurality of information levels that are set corresponding to types of businesses related to the secondary battery.

Doing so allows the information level corresponding to the type of business to be set. Thus, the user convenience is ensured while high safety is ensured when providing information.

Further in a certain embodiment, the output unit transmits the degradation information to the first terminal.

Doing so allows the first terminal to identify the state of health of the secondary battery mounted on the apparatus.

Further in a certain embodiment, the battery management system further includes a second terminal that is communicatively configured with the server via a dedicated line and includes the interface. The second terminal reads the history information from the apparatus and transmits the history information to the server when the second terminal and the apparatus are connected together in a manner capable of the wired communications with each other via the interface.

Doing so obviates the need for a code to read the history information if the second terminal and the server are connected together via the dedicated line, ensuring high safety when providing information.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a flowchart illustrating one example process performed by a second terminal.

FIG. 5 is a diagram for illustrating one example operation of the server, the first terminal, and a vehicle.

DESCRIPTION OF THE PREFERRED EMBODIMENTS

Hereinafter, an embodiment according to the present disclosure will be described in detail, with reference to the accompanying drawings. Note that the same reference sign is used to refer to the same or like parts, and the description thereof will not be repeated.

Figure 1:
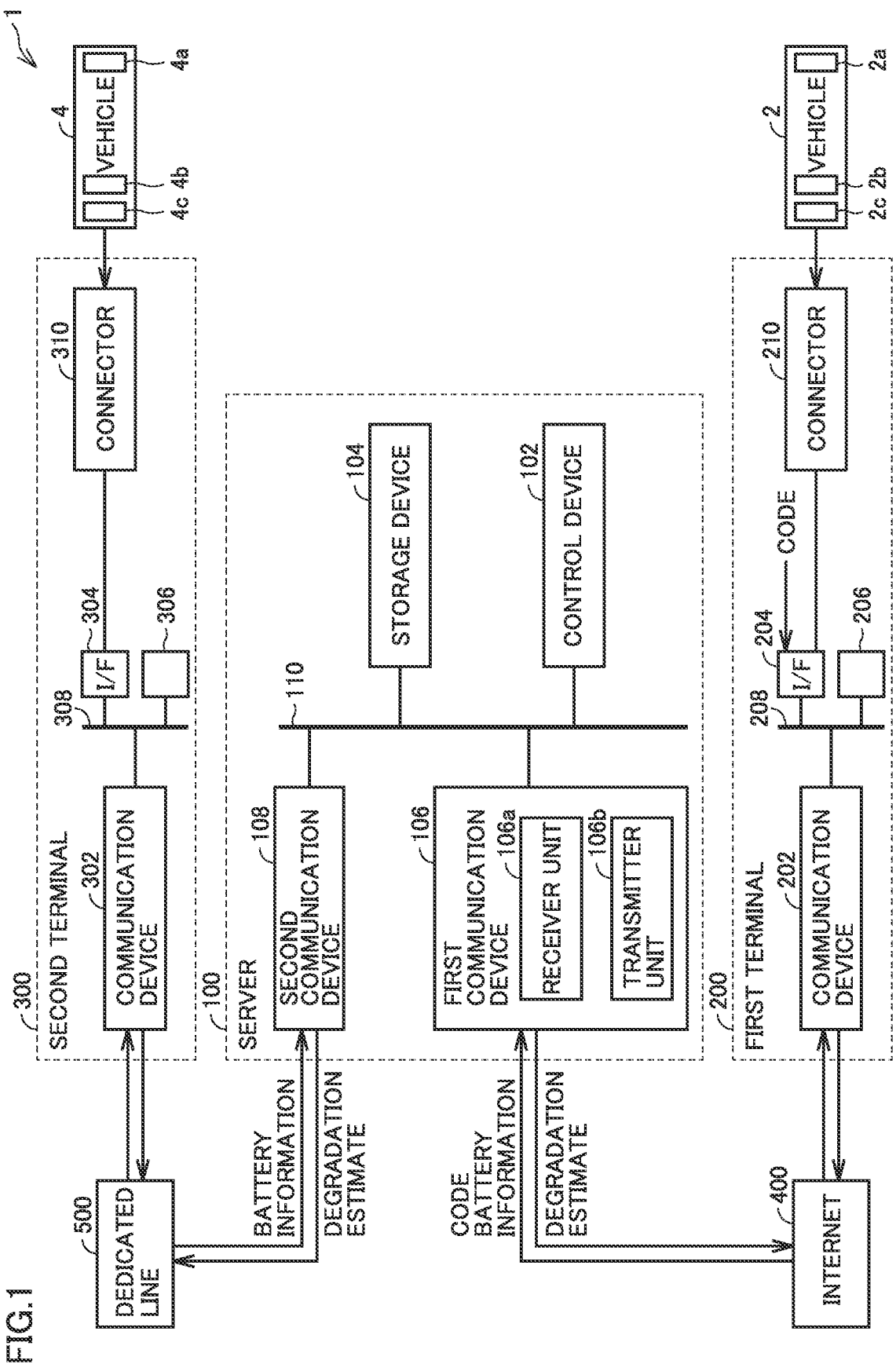
FIG. 1 is a diagram for illustrating one example configuration of a battery management system.

FIG. 1 is a diagram for illustrating one example configuration of a battery management system 1. As shown in FIG. 1, in the present embodiment, the battery management system 1 includes multiple vehicles 2 and 4, a server 100, a first terminal 200, and a second terminal 300.

The vehicles 2 and 4 may be any insofar as they have a secondary battery mounted thereon, for example, a battery electric vehicle using the motor as a drive source, or a hybrid vehicle having the engine and the motor mounted thereon and using at least one of them as a drive source.

The battery management system 1 is configured to obtain/provide various information from/to the first terminal 200 and the second terminal 300 that are communicatively configured with the server 100, thereby managing the information on the secondary batteries mounted on the vehicles 2 and 4.

The server 100 includes a control device 102, a storage device 104, a first communication device 106, a second communication device 108, and a communication bus 110. The control device 102, the storage device 104, the first communication device 106, and the second communication device 108 are communicatively connected to each other via a communication bus 110.

For example, the control device 102 includes: a processor which executes programs, such as a central processing unit (CPU); a memory (such as a read only memory (ROM) and a random access memory (RAM)); and input/output ports (none of which are shown) for input/output of various signals. Various controls are performed by the control device 102 by software processing, that is, the processor reading the programs stored in the memory. The various controls by the control device 102 are also feasible by a general-purpose computer (not shown) executing the programs stored in the storage medium. The various controls by the control device 102 are not limited to software processing, and may be processed by dedicated hardware (an electronic circuit).

For example, the storage device 104 includes a hard disk drive (HDD), a solid state drive (SSD), and a removable media drive, etc., and stores a large volume of data, as compared to the memory included in the control device 102.

The storage device 104 stores predetermined information on multiple vehicles 2 and 4. For example, the predetermined information includes the degradation information of secondary batteries that are mounted on the vehicles 2 and 4 described below, and the information (hereinafter, described as battery IDs) identifying the secondary batteries mounted on the vehicles 2 and 4. For example, the battery ID is unique identification information set for each secondary battery. Suppose that the battery ID of a secondary battery to be managed by the server 100 is stored in the storage device 104. The server 100 is capable of identifying, by the battery ID, a secondary battery corresponding to history information described below.

The first communication device 106 implements two-way communications between the control device 102 and the Internet 400. The server 100 is communicatively configured with the first terminal 200 via the Internet 400. For example, the communications between the first communication device 106 and the Internet 400 is wired communications or wireless communications.

The first communication device 106 includes a receiver unit 106a and a transmitter unit 106b. The receiver unit 106a receives information transmitted from the first terminal 200. For example, the receiver unit 106a receives information about a code input to the first terminal 200, and the history information about the status of a secondary battery 2a that is mounted on the vehicle 2 connected to the first terminal 200. Transmitter unit 106b transmits: information about a result of authentication indicating whether the code is authenticated; and information (hereinafter, described as degradation information) about the degradation of the secondary battery 2a.

The second communication device 108 implements two-way communications between the control device 102 and a dedicated line 500. The server 100 is communicatively configured with the second terminal 300 via the dedicated line 500. The communications between the second communication device 108 and the dedicated line 500 is wired communications or wireless communications. The dedicated line 500 is configured to enable communications limited to between the manufacturer (the server 100) of a vehicle and a seller (the second terminal 300) of the vehicle. For example, the dedicated line 500 may be a communication network off the Internet 400, or a communication network that is constructed by a virtual private network (VPN) on the Internet 400.

For example, the first terminal 200 is owned by various business entities, other than vehicle sellers such as car dealers. For example, the various business entities, other than vehicle sellers, include at least any of business entities among a car buyer, an auto wrecker, a car leasing broker, a business entity as a middleman for used cars, and a business entity conducting businesses related to reuse of secondary batteries.

The first terminal 200 includes a communication device 202, an interface 204, a control device 206, and a connector 210. The communication device 202 is connected to the Internet 400, and capable of transmitting to the server 100 via the Internet 400 the history information about the status of the secondary battery included in the vehicle 2 described below.

For example, the interface 204 includes an input device enabling input of a code, and a connection terminal connectable to the connector 210 via a communication cable.

For example, the control device 206 controls the communication device 202, and performs a predetermined process on data received via the interface 204. A specific configuration and operation of the control device 206 is the same as the configuration and operation of the control device 102 described above, and the description thereof is thus not repeated.

The connector 210 has a shape that permits formation of a connection to a connection terminal 2c of the vehicle 2. The connector 210 is connected to the interface 204 via a communication cable. As the connector 210 is connected to the vehicle 2, communications is enabled between the first terminal 200 and the vehicle 2.

The interface 204 is connected to an input device not shown. The input device receives input of text information from a user. For example, the input device receives input of a code configured of text information.

The vehicle 2 includes a secondary battery 2a, an electronic control unit (ECU) 2b, and a connection terminal 2c.

The secondary battery 2a is a rechargeable direct-current (DC) power supply, for example, a secondary battery such as a nickel-hydrogen battery or a lithium-ion battery containing a solid or liquid electrolyte.

The ECU 2b is a computer having: a processor such as a CPU for executing programs; a memory; and input/output interfaces (not shown). The ECU 2b includes various control programs for controlling various devices mounted on the vehicle 2. Various processes performed by the ECU 2b are not limited to software processing, and may be processed by dedicated hardware (an electronic circuit).

For example, the ECU 2b has a function of monitoring the status of the secondary battery 2a. For example, the status of the secondary battery 2a includes a state of charge (SOC), current, voltage, and temperature of the secondary battery 2a. The ECU 2b causes the history information about the status of the secondary battery 2a to be stored into the memory.

As the connector 210 is connected to the connection terminal 2c, communications is enabled between the ECU 2b and the first terminal 200. For example, the connection terminal 2c is a diagnosis communications terminal having a shape that permits formation of a connection to the connector 210. As the connector 210 is connected to the connection terminal 2c, the first terminal 200 is enabled to communicate with the ECU 2b which includes an on board diagnostics (OBD) for the vehicle 2.

The second terminal 300 includes a communication device 302, an interface 304, a control device 306, and a connector 310. The configuration of the second terminal 300 is the same as the configuration of the first terminal 200, except for performing the communications between the second terminal 300 and the server 100 via the dedicated line 500, instead of via the Internet 400, and the description thereof is thus not repeated.

The vehicle 4 has the same configuration as the vehicle 2, except for connecting to the second terminal 300, and the description thereof is thus not repeated.

In the battery management system 1 as described above, if the history information about the status of the secondary battery 2a stored in the vehicle 2 is obtained via the Internet 400, the safety when providing information may decrease. In particular, the history information about the status of the secondary battery 2a can be used to estimate the status of the secondary battery 2a such as a degradation level or evaluate the performance of the secondary battery and is thus versatile, and high safety is required to be ensured when providing information. In contrast, it is conceivable that various information is provided only through the dedicated line 500 to ensure the safety. However, for example, this may place certain restrictions on the connection to the dedicated line 500 and cause the user convenience to deteriorate.

Thus, in the present embodiment, the server 100 operates as follows. More specifically, when the first terminal 200 and the vehicle 2 are connected together in a manner capable of wired communications with each other via the interface 204, the connector 210, and the connection terminal 2c, and the server 100 receives a code from the first terminal 200, if the code is a predetermined code, the server 100 permits the first terminal 200 to read the history information about the status of the secondary battery 2a from the vehicle 2, and obtains the history information from the first terminal 200. Using the history information obtained from the vehicle 2, the server 100 calculates an estimate of the degradation level of the secondary battery 2a (hereinafter, described as a degradation estimate). Using the calculated estimate, the server 100 outputs the degradation information having an information level corresponding to the code. In the present embodiment, the receiver unit 106a, the control device 102, and transmitter unit 106b included in the server 100 correspond to "an acquisition unit," "a calculation unit," and "an output unit," respectively.

Doing so permits the first terminal 200 to read, by the code, the history information from the vehicle 2, and causes the degradation information having the information level corresponding to the code to be output. Therefore, the degradation information can be provided to the user via the Internet 400, while ensuring the user convenience and ensuring high safety when providing information.

Figure 2:
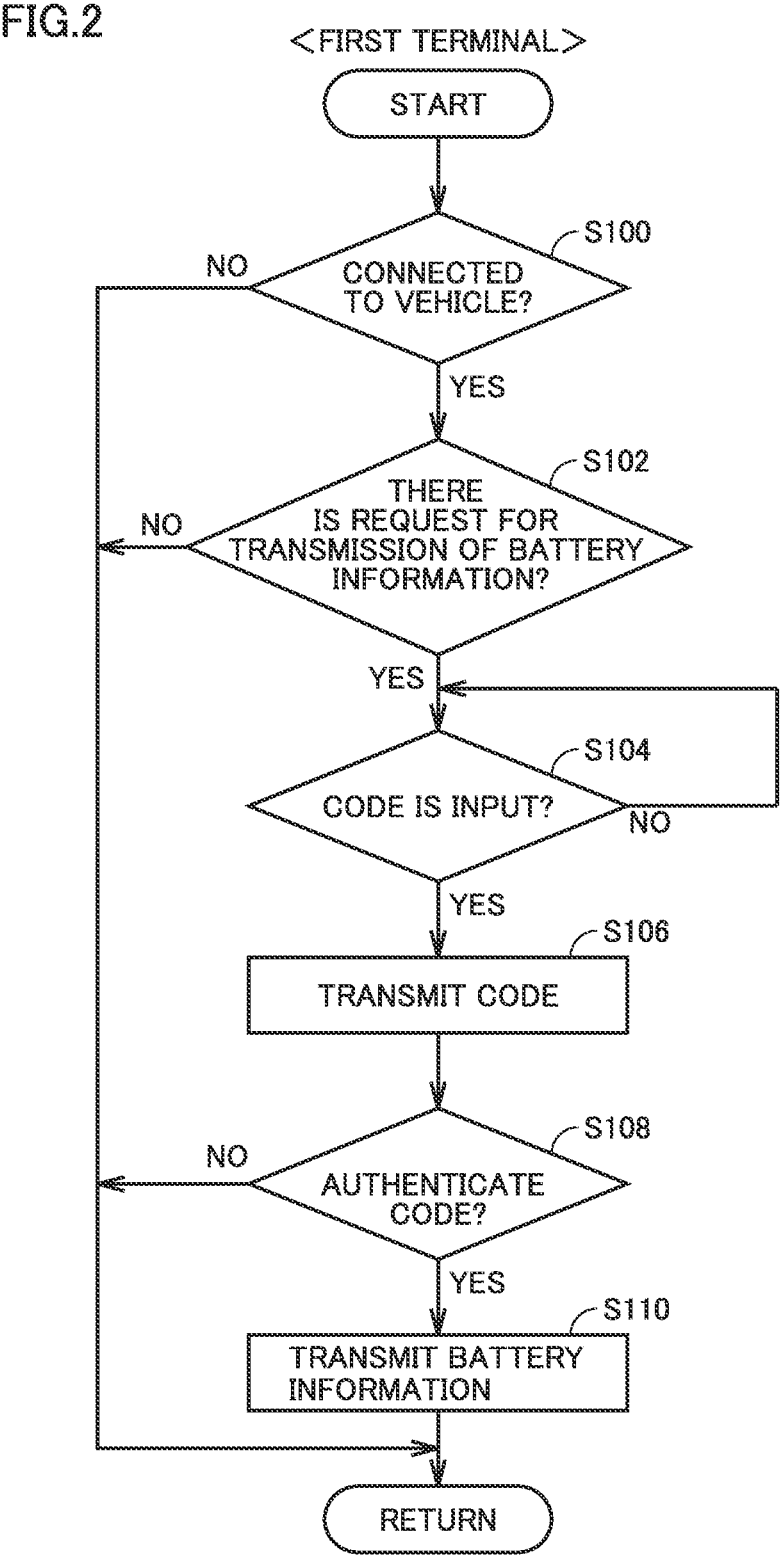
FIG. 2 is flowchart illustrating one example process performed by a first terminal.

In the following, referring to FIG. 2, one example process is described, which is performed by the first terminal 200 (specifically, the control device 206). FIG. 2 is a flowchart illustrating one example process performed by the first terminal 200. The process illustrated in the flowchart is repeatedly performed for every predetermined control cycle by the control device 206 of the first terminal 200.

In step (hereinafter, each process step is described as S) 100, the first terminal 200 determines whether the first terminal 200 is connected to the vehicle 2. For example, the first terminal 200 determines that the first terminal 200 is connected to the vehicle 2 if the connector 210 is connected to the connection terminal 2c of the vehicle 2 and the first terminal 200 receives, from the vehicle 2 via the connection terminal 2c, a signal indicating that the connector 210 is connected to the connection terminal 2c. If the first terminal 200 is determined as being connected to the vehicle 2 (YES in S100), the process moves to S102.

In S102, the first terminal 200 determines whether there is a request for transmission of the history information about the status of the secondary battery 2a (hereinafter, described as battery information). For example, the first terminal 200 determines that there is a battery information transmission request if the first terminal 200 receives, on the input device, an operation indicating a request for transmission of the battery information transmission. If it is determined that there is a battery information transmission request (YES in S102), the process moves to S104.

In S104, the first terminal 200 determines whether a code is input. For example, the first terminal 200 determines that a code is input if the first terminal 200 receives an operation of input of the code on the input device. For example, if it is determined that there is a battery information transmission request, the first terminal 200 shows, on a display device not shown, a display, including text information prompting for input of a code. For example, the code is configured of a predetermined number of digits of characters or symbols. For example, the code may include characters or symbols indicating a type of business, and characters or symbols indicating the business location. For example, the first terminal 200 receives the input of characters or symbols, and causes a combination of the input characters or symbols to be stored into the memory. If the combination of characters or symbols stored in the memory consists of the number of characters and the character type used for a code, the first terminal 200 determines that the code is input. If it is determined that a code is input (YES in S104), the process moves to S106. Note that the process returns to S104 if it is determined that no code is input (NO in S104).

In S106, the first terminal 200 transmits the code to the server 100. Then, the process moves to S108.

In S108, the first terminal 200 determines whether the code is authenticated. For example, the first terminal 200 determines that the code is authenticated if the first terminal 200 receives a result of authentication from the server 100, indicating that the code is authenticated. For example, the first terminal 200 determined that the code is not authenticated if the first terminal 200 receives a result of authentication from the server 100, indicating that the code is not authenticated. If it is determined that the code is authenticated (YES in S108), the process moves to S110.

In S110, the first terminal 200 transmits the battery information. Specifically, for example, the first terminal 200 transmits authentication information indicating that the code is authenticated, and a read request to the vehicle 2. Upon receiving the authentication information and the read request, the vehicle 2 transmits the battery ID and the battery information to the first terminal 200. The first terminal 200 transmits the battery ID and battery information received from the vehicle 2 and information indicating that a source of the battery information is the first terminal 200 to the server 100 via the Internet 400. Then, the process ends. The process also ends if it is determined that the first terminal 200 is not connected to the vehicle 2 (NO in S100), or if it is determined that there is no battery information transmission request (NO in S102), or if it is determined that the code is not authenticated (NO in S108).

Figure 3:
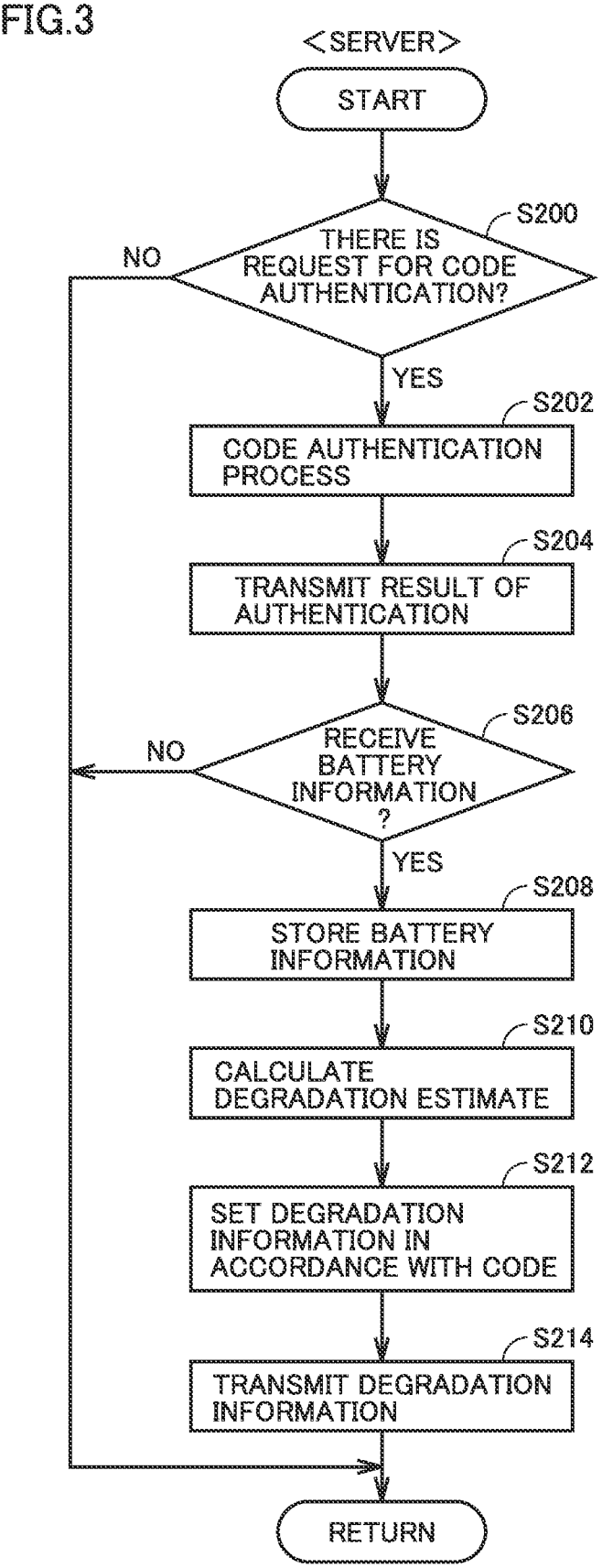
FIG. 3 is a flowchart illustrating one example process performed by a server.

Next, referring to FIG. 3, one example process is described, which is performed by the server 100 (specifically, the control device 102). FIG. 3 is a flowchart illustrating one example process performed by the server 100. The process illustrated in the flowchart is repeatedly performed for every predetermined control cycle by the control device 102 of the server 100.

In S200, the server 100 determines whether there is a request for authentication of code. For example, the server 100 determines that there is a code authentication request if the server 100 receives a code from the first terminal 200 via the Internet 400. If it is determined that there is a code authentication request (YES in S200), the process moves to S202.

In S202, the server 100 performs a code authentication process. As the code authentication process, the server 100 determines whether the code received from the first terminal 200 matches a predetermined code, and obtains a result of the authentication. For example, a number of predetermined codes are pre-stored in the storage device 104 of the server 100. The server 100 determines whether the code received from the first terminal 200 matches at least any of the predetermined codes stored in the storage device 104. If the code matches, the server 100 sets a result of the authentication indicating that the code is authenticated. If the code does not match, the server 100 sets a result of the authentication indicating that the code is not authenticated.

In S204, the server 100 transmits to the first terminal 200 the result of authentication set by performing the code authentication process. For example, the server 100 transmits to the source of the battery information, the result of the authentication and the code received from the first terminal 200. Then, the process moves to S206.

In S206, the server 100 determines whether to receive battery information from the first terminal 200. For example, the server 100 determines whether to receive information indicating battery information from the first terminal 200 within a predetermined time after the transmission of the result of the authentication. If the server 100 receives battery information from the first terminal 200 (YES in S206), the process moves to S208.

In S208, the server 100 causes the battery information received from the first terminal 200 to be stored into the storage device 104. For example, the server 100 causes the information about the source of the battery information, the battery ID, and the battery information to be stored, in association with each other, into the storage device 104. Then, the process moves to S210.

In S210, the server 100 calculates a degradation estimate. For example, the server 100 uses the battery information received from the first terminal 200 to calculate a degradation estimate. For example, the degradation estimate indicates a capacity retention of the secondary battery 2a represented by a percentage of the current full charge capacity of the secondary battery 2a to the full charge capacity of the secondary battery 2a in an initial state.

Note that, alternative to or in addition to the full charge capacity of the secondary battery 2a in the initial state and the current full charge capacity the secondary battery 2a, the degradation estimate may be calculated based on, for example, the temperature environment history of the vehicle 2, the temperature environment history of the secondary battery 2a, the cumulative travel distance, cumulative travel time, cumulative charging time, cumulative number of charging cycles, cumulative discharging time, or cumulative number of discharging cycles of the vehicle 2, etc.

In S212, the server 100 sets degradation information in accordance with the code received from the first terminal 200. The degradation information includes information about an information level corresponding to the code. The information level includes multiple information levels that are set corresponding to the types of business related to a secondary battery. For example, the higher the information level is, the more specific the degradation information is. The lower the information level is, the simpler the degradation information is. For example, suppose that the information levels include a first level, a second level, and a third level, the first level is the information level for the most specific degradation information, and the third level is the information level for the simplest degradation information. In this case, suppose that the first level includes the calculated degradation estimate as is, the third level includes information indicating whether the state of health of the secondary battery 2a indicates that the secondary battery 2a is reusable or not reusable, and the second level includes information indicating a stage of the state of health of the secondary battery 2a, among three or more stages. When setting the degradation information corresponding to the information level equal to the third level, the server 100 sets the degradation information indicating that the state of health of the secondary battery 2a indicates that the secondary battery 2a is reusable if the degradation estimate is greater than a threshold, and sets the degradation information indicating that the state of health of the secondary battery 2a indicates that the secondary battery 2a is not reusable if the degradation estimate is less than the threshold. Similarly, when setting the degradation information corresponding to the information level equal to the second level, the server 100 identifies the stage of the state of health of the secondary battery 2a, among the stages defined by thresholds, and sets the degradation information indicating the identified stage of the state of health.

In the present embodiment, the information levels have been described as including the first level, the second level, and the third level. However, the information levels are not limited to three levels, and may include four or more levels. The first level described above may be any degradation information that is more specific than the second level and is not limited to the level that includes the degradation estimate as is, and may include the information indicating a stage of the state of health among multiple stages more segmented than the second level.

The information level and the code are previously associated together and the association is stored in the storage device 104. For example, the code is set for each business entity. The business entities are various business entities, other than vehicle sellers, as described above, and include at least any of business entities among a car buyer, an auto wrecker, a car leasing broker, a business entity as a middleman for used cars, and a business entity conducting businesses related to reuse of secondary batteries. The information level is set so as to include minimum information necessary for the business entity having a code corresponding the information level.

For example, a car trade-in dealer is required to know the specific degradation level of the secondary battery 2a for assessment of the vehicle 2 as a used car. Therefore, a code set to the car trade-in dealer is associated with the first level, for example. Alternatively, an auto wrecker is required to determine whether the secondary battery 2a of the vehicle 2 is reusable. Therefore, a code set to the auto wrecker is associated with the third level, for example. Alternatively, a recycler is required to broadly classify the intended use of the secondary battery 2a (e.g., whether the secondary battery 2a is reusable as a power supply for an electric-powered vehicle or reusable as a stationary storage battery). Therefore, a code set to the recycler is associated with the second level, for example.

In S214, the server 100 transmits the degradation information to the first terminal 200. Note that this process ends if the server 100 determines that there is no code authentication request (NO in S200) or if the server 100 does not receive the information indicating the battery information from the first terminal 200 within a predetermined time after the transmission of a result of authentication (NO in S206).

Next, referring to FIG. 4, one example process is described, which is performed by the second terminal 300 (specifically, the control device 306). FIG. 4 is a flowchart illustrating one example process performed by the second terminal 300. The process illustrated in the flowchart is repeatedly performed for every predetermined control cycle by the control device 306 of the second terminal 300.

In S300, the second terminal 300 determines whether the second terminal 300 is connected to the vehicle 4. For example, the second terminal 300 determines that the second terminal 300 is connected to the vehicle 4 if the connector 310 is connected to a connection terminal 4c of the vehicle 4 and the second terminal 300 receives, from the vehicle 4 via the connection terminal 4c, a signal indicating that the connector 310 is connected to the connection terminal 4c. If it is determined that the second terminal 300 is connected to the vehicle 4 (YES in S300), the process moves to S302.

In S302, the second terminal 300 determines whether there is a request for transmission of the history information about the status of the secondary battery 4a (hereinafter, described as battery information). For example, the second terminal 300 determines that there is a battery information transmission request if the second terminal 300 receives on the input device an operation indicating a request for transmission of the battery information. If it is determined that there is a battery information transmission request (YES in S302), the process moves to S304.

In S304, the second terminal 300 transmits the battery information. Specifically, the second terminal 300 transmits a read request to the vehicle 4, for example. Upon receiving the read request, the vehicle 4 transmits the battery ID and the battery information to the second terminal 300. The second terminal 300 transmits the battery ID and battery information received from the vehicle 4 and information indicating that the source of the battery information is the second terminal 300 to the server 100 via the dedicated line 500. Then, the process ends. The process also ends if it is determined that the second terminal 300 is not connected to the vehicle 4 (NO in S300), or if it is determined that there is no battery information transmission request (NO in S302).

Note that, upon receiving the battery information from the second terminal 300, the server 100 performs a process of calculating a degradation estimate and transmitting the degradation estimate to the second terminal 300.

An operation of the server 100 and the first terminal 200 based on the structures and flowcharts described above is now set forth, with reference to FIG. 5. FIG. 5 is a diagram for illustrating one example operation of the server 100, the first terminal 200, and the vehicle 2.

For example, assume that a car trade-in dealer assesses the vehicle 2 for buy out. The car trade-in dealer connects, to the connection terminal 2c of the vehicle 2, the connector 210 connected to the first terminal 200. As illustrated in (A) of FIG. 5, as the connector 210 is connected to the connection terminal 2c (YES in S100), it is determined whether there is a transmission request (S102). If it is determined that there is a transmission request made by a user operation on the first terminal 200 as illustrated in (B) of FIG. 5 (YES in S102), it is determined whether a code is input (S104).

As the code, which is set for the car trade-in dealer and contacted, in advance, from the manufacturer of the vehicle, is input to the input device of the first terminal 200 as illustrated in (C) of FIG. 5, the first terminal 200 determines that the code is input (YES in S104), and the code is transmitted to the server 100, as illustrated in (D) of FIG. 5 (S106).

If the server 100 receives the code and thereby determines that there is a code authentication request (YES in S200), the authentication process is performed on the code, as illustrated in (E) of FIG. 5 (S202). Then, if the code is authenticated, a result of the authentication is transmitted to the first terminal 200 (S204) as illustrated in (F) of FIG. 5.

If the first terminal 200 receives the information indicating that the code is authenticated (YES in S108), a process of transmission of the battery information is performed (S110). In other words, a read request is made to the vehicle 2, as illustrated in (G) of FIG. 5. In response to the read request, the battery information is transmitted from the vehicle 2 to the server 100 via the first terminal 200 and the Internet 400, as illustrated in (H) of FIG. 5.

If the server 100 receives the battery information (YES in S206), the battery information is stored into the storage device 104 (S208), as illustrated in (I) of FIG. 5, and a degradation estimate is calculated (S210), as illustrated in (J) of FIG. 5. Then, the degradation estimate is used to set degradation information having an information level corresponding to the code, as illustrated in (K) of FIG. 5 (S212). Then, the generated degradation information is transmitted to the first terminal 200, as illustrated in (L) of FIG. 5 (S214). Then, the first terminal 200 receives the degradation information from the server 100, as illustrated in (M) of FIG. 5.

As described above, according to the battery management system 1 of the present embodiment, the first terminal 200 is permitted to read the history information from the vehicle 2 by the code, and the degradation information having the information level corresponding to the code is output. Therefore, the degradation information can be provided to the user via the Internet 400, while ensuring the user convenience and ensuring high safety when providing information. Accordingly, the degradation information of the secondary battery is provided to a user while ensuring the user convenience and ensuring high safety when providing information.

Furthermore, the information level corresponding to the type of business is set. Thus, the user convenience is ensured while high safety is ensured when providing information.

Furthermore, the transmission of the degradation information from the server 100 to the first terminal 200 allows the first terminal 200 to identify the state of health of the secondary battery 2a mounted on the vehicle 2.

Furthermore, the second terminal 300 and the server 100 being connected together via the dedicated line 500 obviates the need for a code to read the history information, ensuring the user convenience and ensuring high safety when providing information.

In the following, variations are described.

The embodiment has been described above with reference to the control device 102 of the server 100 using one processor and one memory to perform the process. However, the process illustrated in the flowchart of FIG. 3 may be performed by one or more processors reading and executing programs stored in one or more memories.

Furthermore, the embodiment has been described above with reference to the control device 206 of the first terminal 200 using one processor and one memory to perform the process. However, the process illustrated in the flowchart of FIG. 2 may be performed by one or more processors reading and executing programs stored in one or more memories.

Furthermore, the embodiment has been described above with reference to the first terminal 200 transmitting, to the server 100 and in addition to the battery information, the battery ID and the information indicating that the first terminal 200 is the source of the battery information. However, for example, the location information of the first terminal 200 may be transmitted to the server 100, in addition to the battery information. Doing so allows the server 100 to locate the first terminal 200, thereby determine whether the first terminal 200 is a legitimate business entity. Note that the first terminal 200 may use, for example, an artificial satellite, such as a global positioning system (GPS), or a known location detection device using a wireless-communication base station to obtain the location information of the first terminal 200.

Furthermore, the embodiment has been described above with reference to setting an information level corresponding to the type of a business entity and transmitting the degradation information having a certain information level to a certain business entity. However, a business entity may be allowed to purchase various levels of degradation information.

Furthermore, the embodiment has been described above with reference to the server 100 transmitting to the first terminal 200 the degradation information that is set using the battery information received from the first terminal 200. However, the server 100 may transmit the degradation information to a terminal different from the first terminal 200.

Furthermore, the embodiment has been described above with reference to the first terminal 200 being connected to the vehicle 2 or the second terminal 300 being connected to the vehicle 4. However, the connection point is not particularly limited to a vehicle. Instead of the vehicle, the first terminal 200 or the second terminal 300 may be connected to, for example, an apparatus that is equipped with a secondary battery and a storage unit storing the history information of the secondary battery. Furthermore, the battery management system 1 according to the present embodiment may not include the second terminal 300 connected to the dedicated line 500.

Furthermore, the embodiment has been described above with reference to the first terminal 200 or the second terminal 300 determining whether there is a request for the battery information. However, the process step S102 of the flowchart of FIG. 2 and the process step of S302 of the flowchart of FIG. 4 may be omitted.

Note that all or some of the variations described above may be combined and implemented, as appropriate.

While the embodiment according to the present disclosure has been described above, the presently disclosed embodiment should be considered in all aspects illustrative and not restrictive. The scope of the present disclosure is indicated by the appended claims, and all changes that come within the scope of the claims and the meaning and range of equivalency of the claims are intended to be embraced within their scope.

What is claimed is:

1. A battery management system, comprising:
an apparatus on which a secondary battery and a storage unit storing history information of the secondary battery are mounted;
a server that manages degradation information of the secondary battery; and
a first terminal that is communicatively configured with the server via the Internet and includes an interface capable of wired communications with the apparatus, wherein the server includes at least one processor configured to:
permit the first terminal to read the history information from the apparatus and obtain the history information from the first terminal when the first terminal and the apparatus are connected together in a manner capable of the wired communications with each other via the interface and receive a code from the first terminal and the code is a predetermined code;
calculate an estimate of a degradation level of the secondary battery, using the history information obtained; and
output the degradation information having an information level corresponding to the code, using the estimate, and
wherein the code includes information indicating at least one of a type of a business and a location of the business.

2. The battery management system according to claim 1, wherein
the information level includes a plurality of information levels that are set corresponding to types of businesses related to the secondary battery.

3. The battery management system according to claim 1, wherein
the at least one processor further transmits the degradation information to the first terminal.

4. The battery management system according to claim 1, further comprising
a second terminal that is communicatively configured with the server via a dedicated line and includes the interface, wherein
the second terminal reads the history information from the apparatus and transmits the history information to the server when the second terminal and the apparatus are connected together in a manner capable of the wired communications with each other via the interface.

* * * * *